US005388201A

United States Patent [19]

[11] Patent Number: 5,388,201

[45] Date of Patent: Feb. 7, 1995

Hourvitz et al.

[54] METHOD AND APPARATUS FOR PROVIDING MULTIPLE BIT DEPTH WINDOWS

[76] Inventors: Leonard Hourvitz, 21155 Skyline Blvd., La Honda, Calif. 94020; Peter Graffagnino, 1948 B Washington St., San Francisco, Calif. 94109; Harold Cohn, 777 W. Middlefield Rd. #62, Mountain View, Calif. 94043

[21] Appl. No.: 106,150

[22] Filed: Aug. 11, 1993

Related U.S. Application Data

[63] Continuation of Ser. No. 589,440, Sep. 14, 1990, abandoned.

[51] Int. Cl.[6] .............................................. G06F 15/62

[52] U.S. Cl. .................................................... 395/157

[58] Field of Search ............................... 395/155-161, 395/165, 131-132, 114-116, 120-122, 135, 128, 166; 345/150-153, 155, 118, 119, 120, 187; 358/80

[56] References Cited

U.S. PATENT DOCUMENTS

| | | | |
|---|---|---|---|
| 4,454,593 | 6/1984 | Fleming et al. | 340/703 X |
| 4,542,376 | 9/1985 | Bass et al. | 395/158 X |
| 4,550,315 | 10/1985 | Bass et al. | 340/703 |
| 4,555,775 | 11/1985 | Pike | 395/158 |
| 4,559,533 | 12/1985 | Bass et al. | 340/747 X |
| 4,639,771 | 1/1987 | Hattori et al. | 358/80 |
| 4,857,901 | 10/1989 | Lathrop | 340/703 |
| 4,857,909 | 8/1989 | Mizushima | 340/703 X |
| 4,862,154 | 8/1989 | Gonzales-Lopez | 340/747 |
| 4,982,343 | 1/1991 | Hourvitz et al. | 395/135 |
| 5,038,300 | 8/1991 | Seiler et al. | 395/131 |
| 5,041,992 | 10/1991 | Cunningham et al. | 395/135 |
| 5,083,257 | 1/1992 | Kennedy | 340/703 X |
| 5,091,717 | 2/1992 | Carrie et al. | 340/703 |
| 5,101,365 | 3/1992 | Westberg et al. | 395/158 |
| 5,122,784 | 6/1992 | Canova | 340/703 |
| 5,128,658 | 7/1992 | Pappas et al. | 340/703 |
| 5,155,478 | 10/1992 | Sekiya et al. | 395/132 |

*Primary Examiner*—Heather R. Herndon
*Assistant Examiner*—John E. Breene
*Attorney, Agent, or Firm*—Hecker & Harriman

[57] ABSTRACT

A method and apparatus for allocating memory space in main memory of an associated processor for a plurality of windows. The depth in each window is independent of other windows on the display and can be changed dynamically. An application program is not required to know the frame buffer depth in advance. When a window is created, a default depth (e.g., two bits per pixel) is defined for the window. When a program writes to the window, drawing commands are interpreted and the appropriate depth is provided.

16 Claims, 6 Drawing Sheets

FIG. 6B
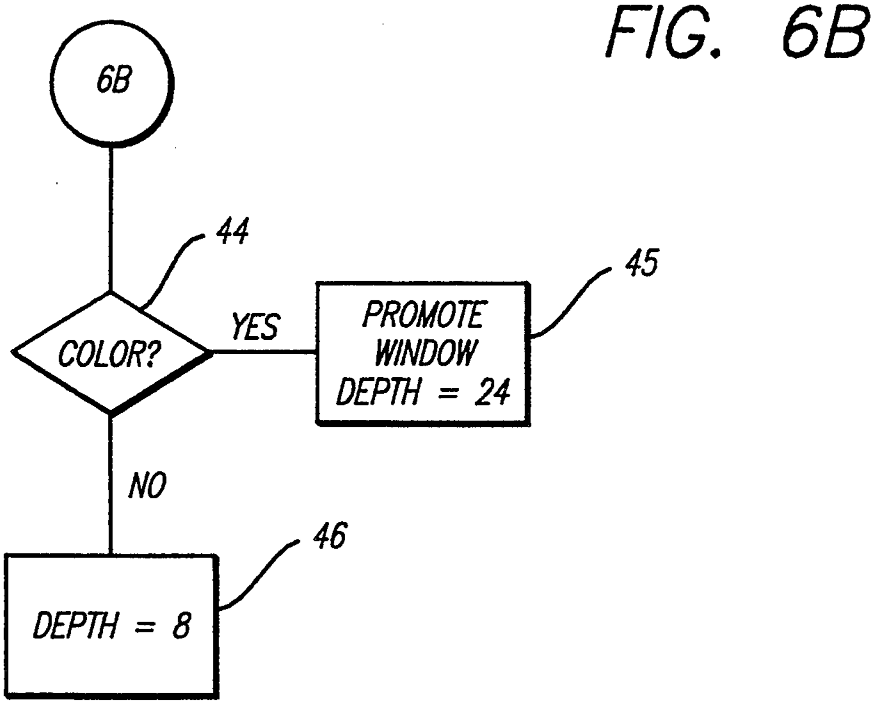
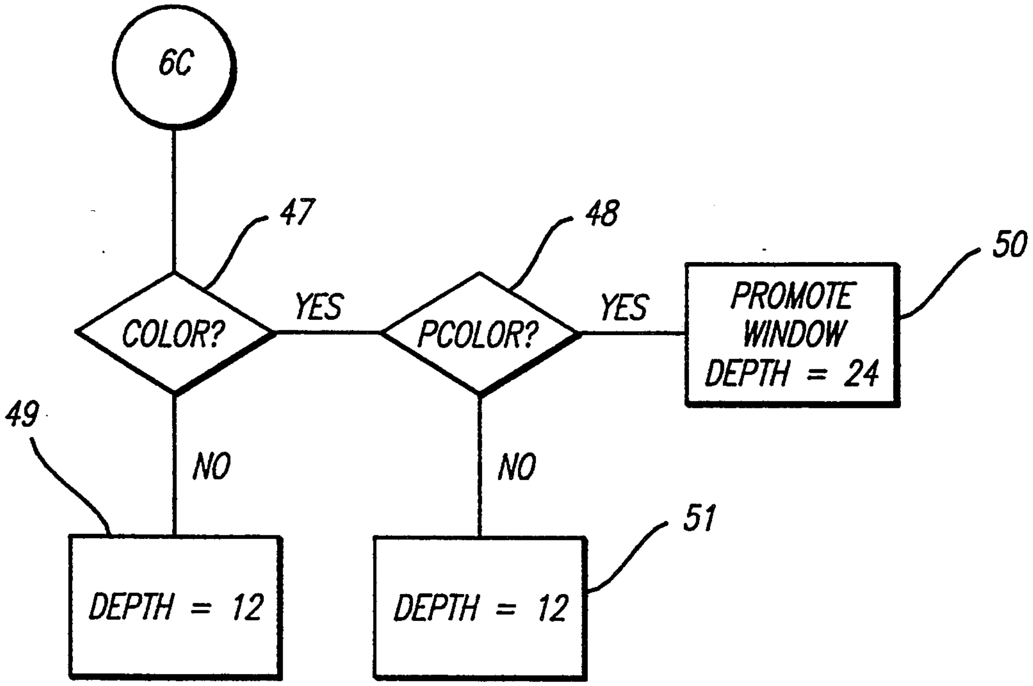
FIG. 6C

METHOD AND APPARATUS FOR PROVIDING MULTIPLE BIT DEPTH WINDOWS

This is a continuation of application Ser. No. 07/589,440 filed Sep. 14, 1990, now abandoned.

BACKGROUND OF THE INVENTION

1. Field of the Invention

This invention relates to the field of computer displays, and in particular, to the creation and display of windows on a computer display.

2. Background Art

In a multi-tasking environment, a plurality of computer programs, such as application programs (hereinafter referred to as "programs") can be used simultaneously by a computer user. Each program may have one or more associated windows for receiving display data. Each window and its associated display data is displayed on a display device, such as a video or liquid crystal display (LCD). The user may enter commands and interact with a program by manipulating data or images in a window or by selecting operations from a menu associated with the window or associated program, using input devices such as a mouse, keyboard, etc.

In response to user inputs or other operations, a program updates or changes its display information. The process by which a program provides display information to a screen display is known as "drawing" to a window or "writing to" a window. A display window can overlap other windows, partially or completely obscuring the windows beneath it. One window or set of windows is typically the "active window" and most user interaction is with this active window.

A controller is used to monitor window size, position and status (active or non-active). This controller, often referred to as a window server, acts as an interface between a program and a display screen.

A block diagram of a computer system having a window server is illustrated in FIG. 1. A plurality of programs 10A–10N provide drawing commands on lines 11A–11N to window server 12. Each application draws into its associated windows. The window server 12 determines the display information that is actually visible based on the window position and hierarchy and provides output on line 13 to frame buffer 14. Frame buffer 14 stores the pixel representation of the display screen. Frame buffer 14 provides display information on line 15 to display screen 16. The contents of frame buffer 14 are then displayed on display 16.

Depending on the display output requirements of an individual program, one of three window types can be implemented. These types are referred to as "non-retained" windows, "retained" windows and "buffered" windows. Examples of these types or windows are illustrated in FIGS. 2–4.

NON-RETAINED WINDOWS

FIG. 2 illustrates a non-retained window scheme. Two windows, A and B, are defined on display screen 16. Window B is the topmost "active" window and partially obscures window A, so that window A is divided into two areas, a visible region 17 and a non-visible region 18 (indicated by a dashed line). When program A writes to window A, it writes to the entire window, both visible and non-visible regions. The window server draws to the screen only the display information in visible region 17. The portion in non-visible portion 18 is discarded. If window A is moved or becomes the active window, the region 18 of window A is blank. Therefore, the program A must be called to redraw the window in the newly visible regions. In a multi-tasking system that uses virtual memory, significant delays can result in a non-retained window scheme. This is because an application may not currently reside in physical memory and must be paged into physical memory from secondary storage to operate. Paging is a relatively slow operation, resulting in delays in drawing to the screen.

RETAINED WINDOWS

A retained window scheme, such as illustrated in FIG. 3, provides a solution to delays resulting from paging. In the example shown, window A is again partially obscured by window B so that window A has a visible region 17 and a non-visible obscured region 18. In a retained window scheme, a buffer 19, (also referred to as a "backing store") is provided for each window. The window server draws the visible portion 17 of window A onto the display screen 16 and draws the obscured region 18 into the backing store buffer 19. If some or all of region 18 becomes visible, the information associated with the uncovered portion is copied from backing store 19 to screen display 16. This can be accomplished without calling program A so that paging delays are avoided. If additional portions of window A become obscured, a copy of those additional portions is made from the frame buffer and provided to the backing store buffer 19. The backing store 19 is equal to the size of the window since all of the window may be obscured at one time or another.

BUFFERED WINDOWS

In the non-retained and retained windowing schemes of FIGS. 2 and 3, drawing of display data is done directly to the screen display 16. In the buffered window scheme of FIG. 4, drawing is done to backing store buffer 19. The backing store buffer is the same size as its associated window. All drawing is done in the backing store buffer 19 and those portions that are visible and modified are then copied to the screen display 16. For example, window A is drawn entirely in backing store buffer 19 and only the visible region 17 is then copied to the screen display 16. A buffered window scheme is particularly useful in graphic applications where the process of drawing is relatively time consuming. By using the buffer, a user sees only the finished drawing, and not the drawing process itself.

The backing store buffers are typically implemented in the main memory of the processor associated with the resident computer system.

A disadvantage of prior art computer systems that implement retained and buffered window schemes is an inefficient use of memory. In such schemes, for each display window, a backing store buffer is provided that is the same size, in terms of memory, as the display window. The total amount of memory required for each display window and each backing store buffer is dependent on the "depth" of the frame buffer.

To understand the depth of a frame buffer, first consider a computer display. A display screen is comprised of an array of picture elements (pixels). Each pixel is a discrete point on the display. Images are produced on a display screen by "turning on" selected pixels. Thus, display images may be comprised, for example, of a plurality of small points of light that, when viewed from a distance, combine to form an image. The resolution of the image of the display in that example is dependent on the number of brightness or color levels that each pixel can represent. This, in turn, is dependent on the depth of the frame buffer.

Each pixel is represented in the frame buffer memory by one or more bits. The resolution of the display image is dependent on the number of bits representing each pixel in the frame buffer. The bits per pixel depth of a frame buffer is constant and depends on the amount of memory provided for the frame buffer.

If only one bit is provided for each pixel in the frame buffer, each pixel can assume one of only two values, on or off (black or white). Thus, a one bit per pixel system is a monochromatic system. Shading of a single pixel is not possible in a monochromatic display system. If a plurality of bits are provided for each pixel in a frame buffer, it becomes possible for pixels to assume intermediate levels. For example, if the frame buffer provides two bits per pixel, four levels of brightness can be defined; off (00), a first level of brightness (01), a second level of brightness (10) and full on (11). By providing more bits per pixel in the frame buffer, more levels of gray can be represented and displayed.

Color images can be achieved on a computer display by providing pixels that can represent primary colors (red, green, and blue). To display high resolution color images, a greater number of bits per pixel is required. Many color display systems provide 24 bits per pixel depth frame buffers. The eight most significant bits represent the intensity of the red contribution to the display pixel, the next eight most significant bits represent the intensity of the green contribution, and the eight least significant bits represent the blue contribution. Thus, 256 levels each of red, green, and blue can be defined in a 24 bit per pixel system with a total of over sixteen million possible colors of the display pixel.

In prior art systems, the depth of the frame buffer controls the depth of the backing store buffers. That is, if the frame buffer is 24 bits per pixel, then the backing stores are 24 bits per pixel as well. This leads to inefficiencies in memory usage. For example, many programs require only one or two bits per pixel resolution of the display image. Assigning 24 bits per pixel to the backing stores of these programs is unnecessary and wastes memory.

It is an object of the present invention to provide a method of defining backing store buffers which is independent of the depth of an associated frame buffer.

It is also an object of the present invention to provide a method of defining backing store buffers where the depth of the backing store buffer is configured automatically.

It is yet another object of the present invention to provide a method of defining backing store buffers that is implemented at a system level.

It is yet another object of the present invention to provide a method of automatically selecting the depth of a window backing store that requires the least allocation of memory resources, based on the drawing requirements of a program drawing to the window.

SUMMARY OF THE INVENTION

In the proposed invention, memory space in main memory of an associated processor is allocated for each window of an application when the window is created. The depth in each window is independent of other windows on the display and can be changed dynamically. An application program is not required to know the frame buffer depth or desired window depth in advance. When a window is created, a default depth (e.g., two bits per pixel) is defined for the window. When a program writes to the window, drawing commands are interpreted and the appropriate depth is provided.

BRIEF DESCRIPTION OF THE DRAWINGS

FIG. 6A–6D are flow diagrams illustrating the operation of the present invention.

DETAILED DESCRIPTION OF THE INVENTION

A method and apparatus for providing windows having a depth independent of frame buffer depth is described. In the following description, numerous specific details, such as window depth, number of states, etc., are set forth in detail in order to provide a more thorough description of the invention. It will be apparent, however, to one skilled in the art, that the present invention may be practiced without these specific details. In other instances, well known features have not been described in detail so as not to unnecessarily obscure the present invention.

Figure 1:
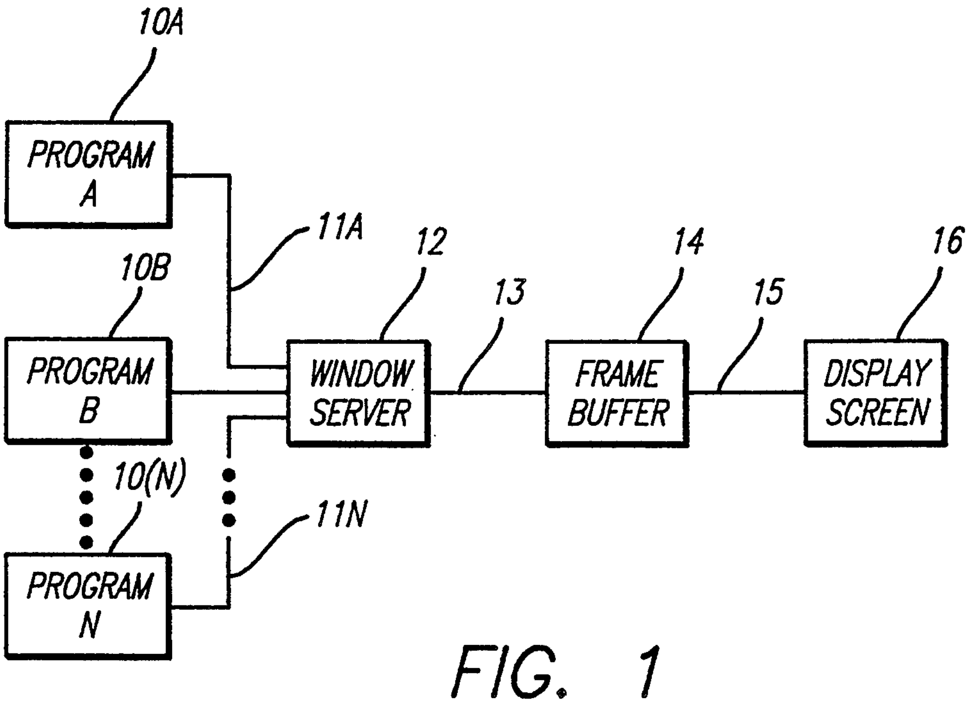
FIG. 1 is a block diagram illustrating a computer system.
Figure 2:
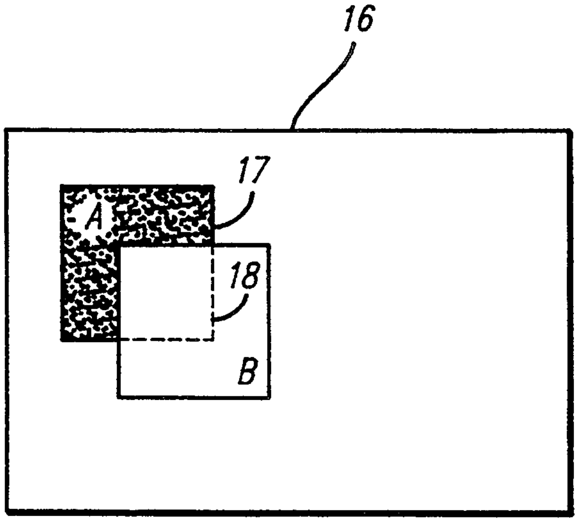
FIG. 2 is a diagram illustrating a non-retained window scheme.
Figure 3:
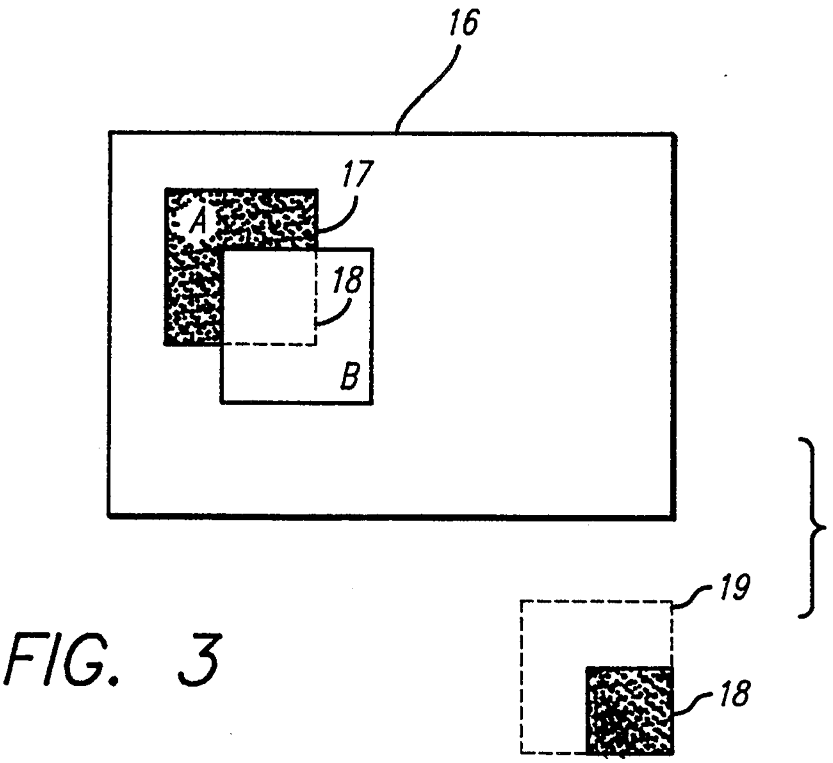
FIG. 3 illustrates a retained window scheme.
Figure 4:
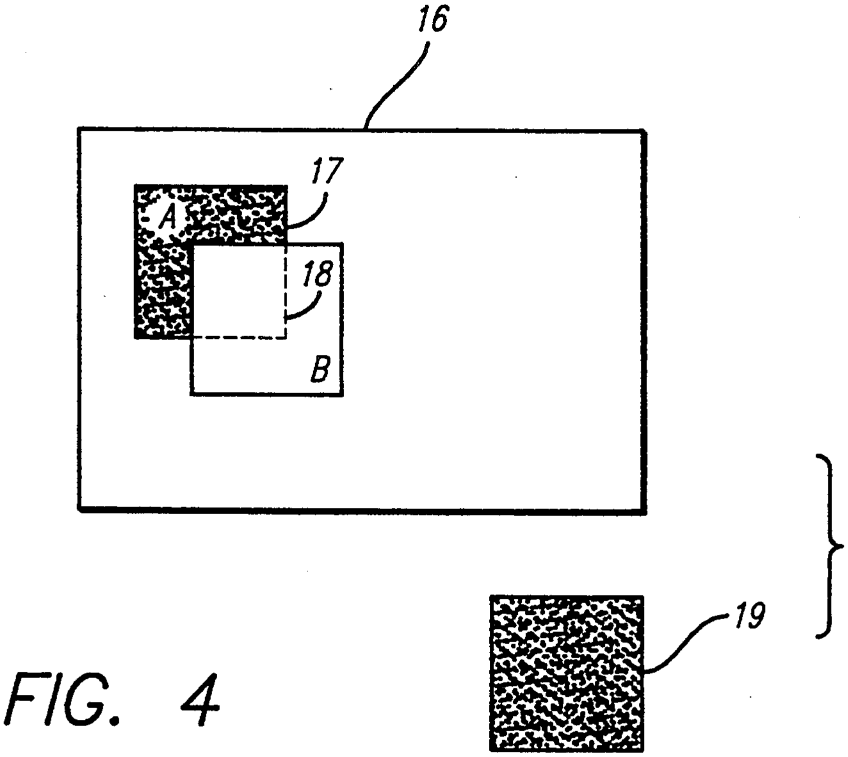
FIG. 4 illustrates a buffered window scheme.
Figure 5:
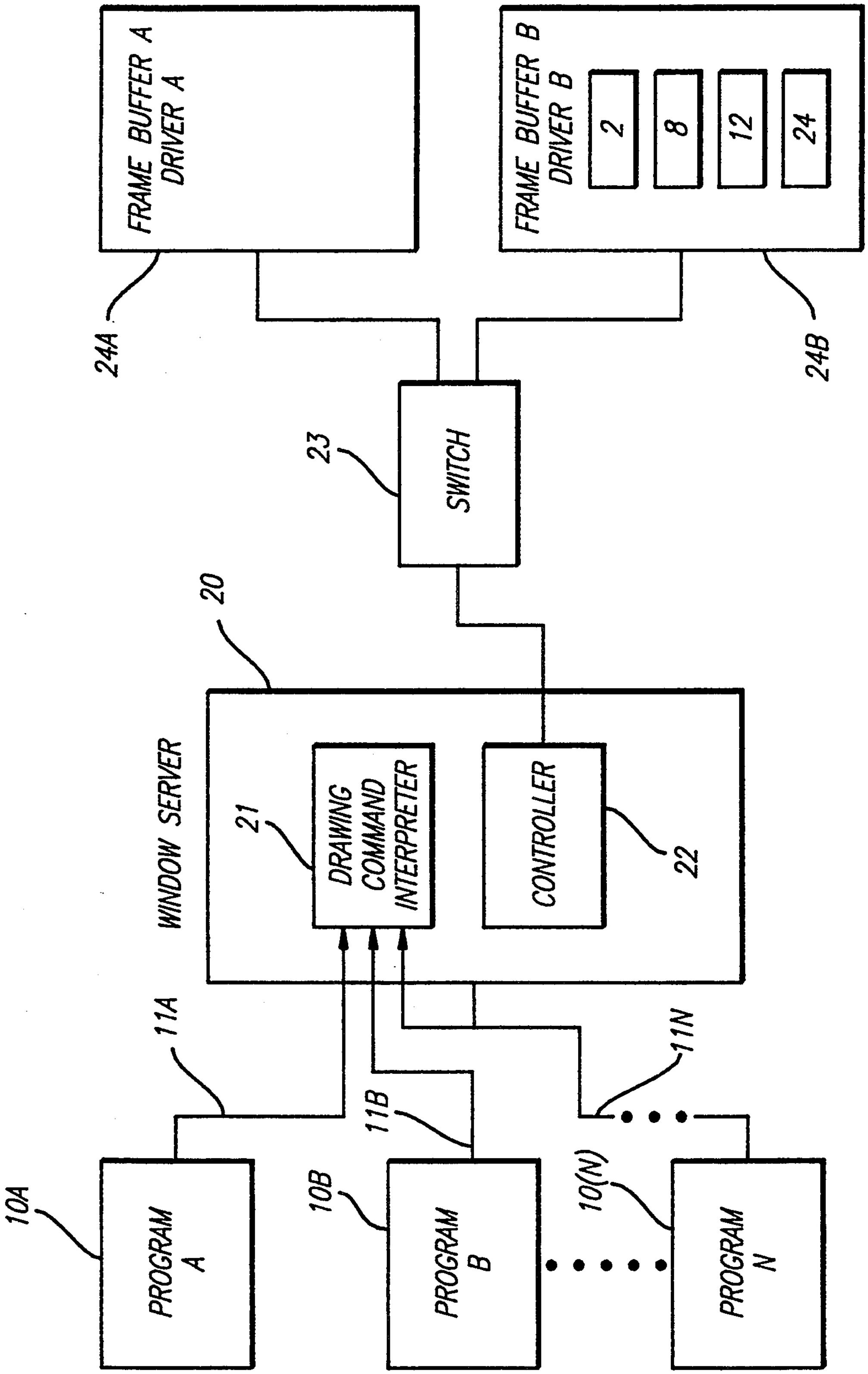
FIG. 5 is a block diagram of the present invention.

A block diagram of the present invention is illustrated in FIG. 5. A plurality of programs 10A–10N are coupled through lines 11A–11N to a window server 20. The window server is implemented in software in the preferred embodiment of this invention and includes a drawing command interpreter 21 coupled to a control block 22. The drawing command interpreter 21 is used to interpret drawing commands provided by the programs. The controller 22 determines the window depth required for the drawing operation and creates backing store buffers accordingly. The control block 22 also determines whether the application is drawing in a non-retained window format, retained window format or buffered format.

In the preferred embodiment of the present invention, a PostScript ® drawing scheme is used and the drawing command interpreter is a PostScript ® interpreter. The window server and drawing command interpreter are implemented in an operating system based on the UNIX ® operating system developed by AT&T. The computer system may be the NeXT computer system, manufactured by NEXT, Inc., of Redwood City, Calif.

After the controller 22 has determined the desired depth of the window associated with the program drawing commands, it provides output to switch 23 which selects from one or more frame buffer drivers 24A and 24B. In a computer system, more than one display screen, and therefore more than one frame buffer, may be utilized. In addition, the frame buffers may be of different depths. For example, in the example of FIG. 5, the frame buffer driver A drives a frame buffer having a two bit per pixel depth. Frame buffer driver B drives a frame buffer having 24 bit per pixel depth.

In the present invention, any depth window can be supported. However, the present invention will be described by way of example where only four depths of window are supported, namely 2 bits per pixel (approximate gray), 8 bits per pixel (precise gray), 12 bits per pixel (approximate color) and 24 bits per pixel (precise color). The default window depth is 2 bits per pixel.

When a new display window is created or initialized by a program, it is created at a default depth (e.g., 2 bits per pixel), and correspondingly, its backing store buffer is set to the default depth as well. If a program drawing to the window requires greater resolution than the window currently provides, the window is "promoted" to a greater depth. In this invention, "window promotion" and "promoting a window" refers to the process of increasing the depth of a window and any associated backing store buffer.

Figure 7:
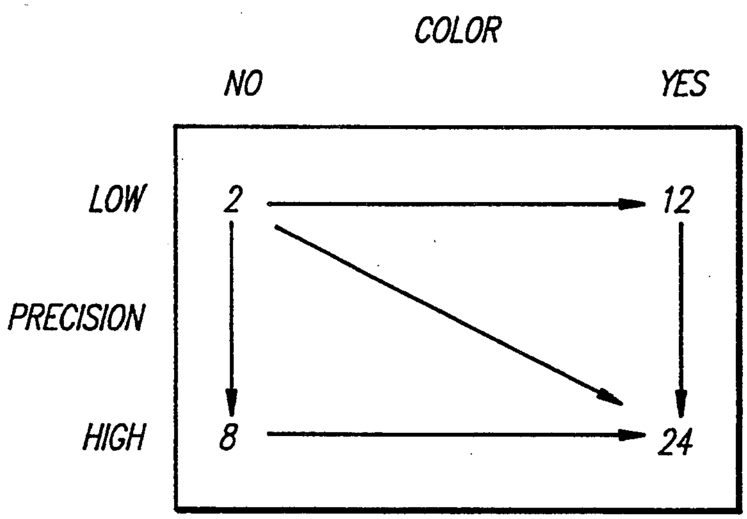
FIG. 7 is an illustration of a promotion table in the preferred embodiment of this invention.

A promotion table is illustrated in FIG. 7. The table of FIG. 7 represents the permissible promotions of windows in the preferred embodiment of this invention. The table of FIG. 7 includes entries for low precision gray scale (2 bits per pixel), high precision gray scale (8 bits per pixel), low precision color (12 bits per pixel) and high precision color (24 bits per pixel). A window at the default depth of 2 bits per pixel can be promoted to 8 bits per pixel, 12 bits per pixel or 24 bits per pixel. A window state at either 8 bits per pixel or 12 bits per pixel can only be promoted to a window having; 24 bit per pixel depth. Window promotion is determined by an algorithm driven by information in the drawing commands of a program.

The algorithm is set forth below:

LPromoteLayer

Determines if promotion should happen for the layer (window) given the specified arguments. pColor is valid only if isColor is true. pColor is true if the precision of color is high. pGray is always valid and true if the precision of gray is high. LPromoteLayer will set the capped flag if the layer is promoted to its depthLimit. The capped flag, if set, indicates that the window can no longer be promoted, and thus, further checks against its promotion are unnecessary. The use of the capped flag is an optimization technique, and the present invention may be practiced without use of the capped flag. It will also promote the layer if it determines it necessary. NOTE: Color overrides gray.

```
void LPromoteLayer (Layer *Layer, boolean isColor, boolean pColor,
boolean pGray)
{
int depth = 0, cap = layer->depthLimit;
switch (cap) {
case NX_TWOBITGRAY:
        break;
case NX_EIGHTBITGRAY:
case NX_TWELVEBITRGB:
        if (isColor || pGray) depth = cap;
        break;
case NX_TWENTYFOURBITRGB:
        switch (layer->currentDepth) {
case NX_TWOBITGRAY:
        if (isColor) depth = pColor || pGray ? cap :
                        NX_TWELVEBITRGB:
        else if (pGray) depth = NX_EIGHTBITGRAY;
        break;
case NX_EIGHTBITGRAY:
        if (isColor) depth = cap;
        break;
```

```
        case NX_TWELVEBITRGB:

              if (pGray | | (isColor && pColor)) depth = cap;

              break;
        }
        break;
}

    /* Non-zero "depth" indicates promotion should take place */
    if (depth) {

        NXBag *bag;

        DevMarkInfo info;

        /* Make sure that the backing store is up-to-date

        *before promoting it!

        */
        if (layer->layerType == RETAINED)
              PieceApplyProc (layer->tree, BPCopyback);

        PSGetMarkInfo (NULL, &info);

        for (bag = layer->bags; bag; bag = bag->next) {

              (*bag->procs->PromoteWindow) (bag, &layer->bounds,

        depth, layer->layerType, info.screenphase);

        }
        layer->currentDepth = depth;

        layer->capped = (depth == cap);
    }
    } /* end of LPromoteLayer */
```

Figure 6A:
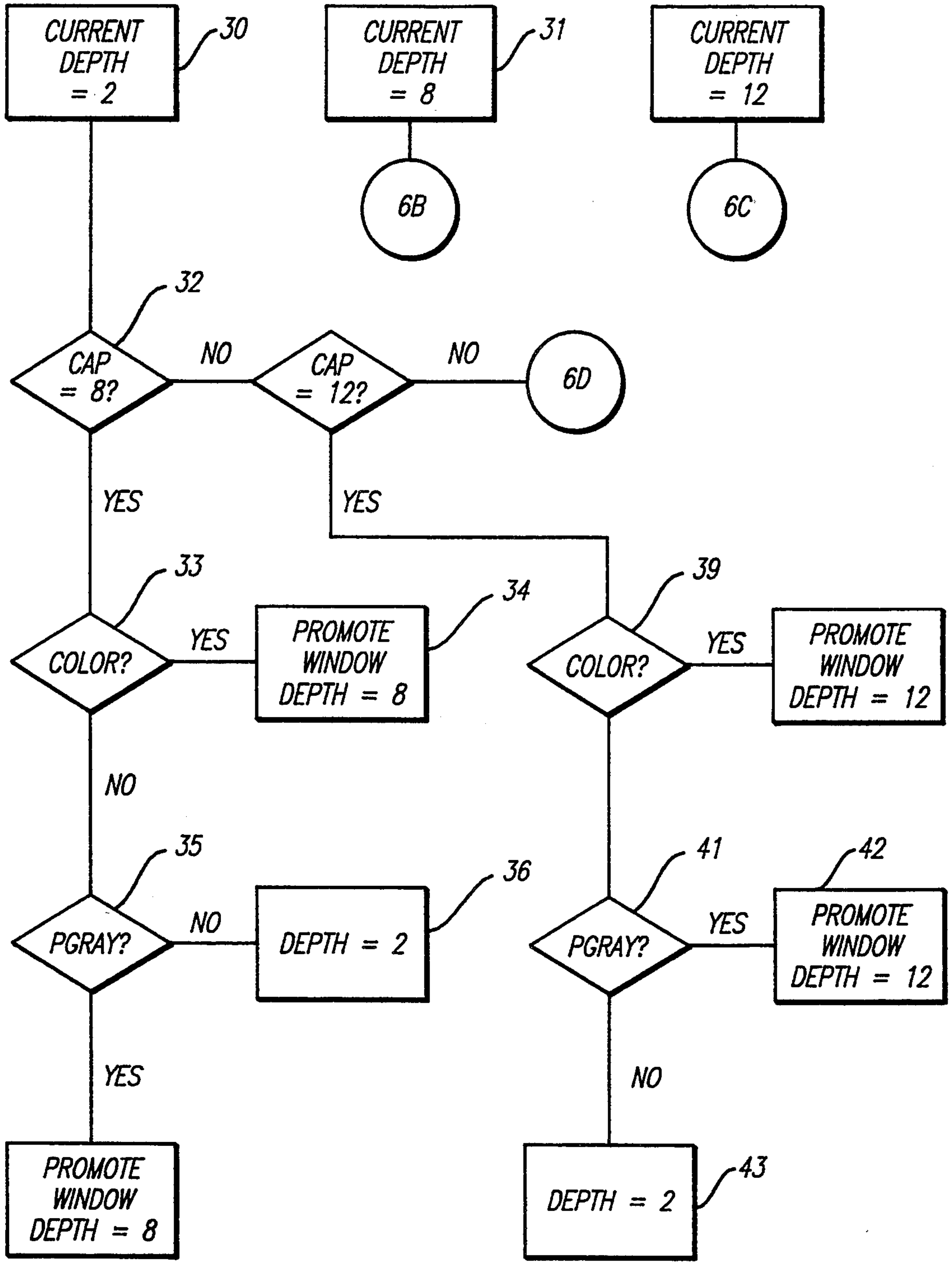

The operation of the promotion algorithm is illustrated in FIGS. 6A–6D. Referring first to FIG. 6A, when the controller receives a drawing command, it checks the current depth of the window. If the current depth is 2 bits per pixel, the algorithm begins at step 30. If the current depth is 8 bits per pixel, the algorithm begins at step 31, and if the current depth is 12 bits per pixel, the algorithm begins at step 6C.

If the current depth is 2 bits per pixel, the system proceeds to step 32 to determine the "cap", (or depth limit), that is, the maximum number of bits per pixel that are available to, or required by, the program. At decision block 32, the argument "is cap equal to 8" is made. If the argument is false, the system proceeds to step 38 and the argument "is cap=12" is made. If the argument at decision block 38 is false, the system proceeds to step 6D and the cap is equal to 24 bits per pixel.

If the argument at decision block 32 is true, the cap is equal to 8 bits per pixel and the system proceeds to decision block 33. At decision block 33, it is determined if color is requested. If color is requested, the system proceeds to step 34 and the window is promoted to a depth of 8 bits per pixel. If color is not required, the system proceeds to decision block 35 and it is determined if precision gray scale is requested. If precision gray scale is not requested, the system proceeds to step 36 and the depth of the window remains at 2 bits per pixel. If precision gray scale is required, the system proceeds to step 37 and the window is promoted to a depth of 8 bits per pixel.

If, at decision block 38, the cap is equal to 12 bits per pixel, the system proceeds to decision block 39 to determine if color is requested. If color is requested, the system proceeds to step 40 and the window is promoted to a depth of 12 bits per pixel. If color is not requested, the system proceeds to decision block 41 and it is determined if precision gray is requested. If precision gray is requested, the system proceeds to step 42 and the window is promoted to a depth of 12 bits per pixel. If precision gray is not requested, the system proceeds to step 43 and the window remains at a depth of 2 bits per pixel.

Figure 6D:
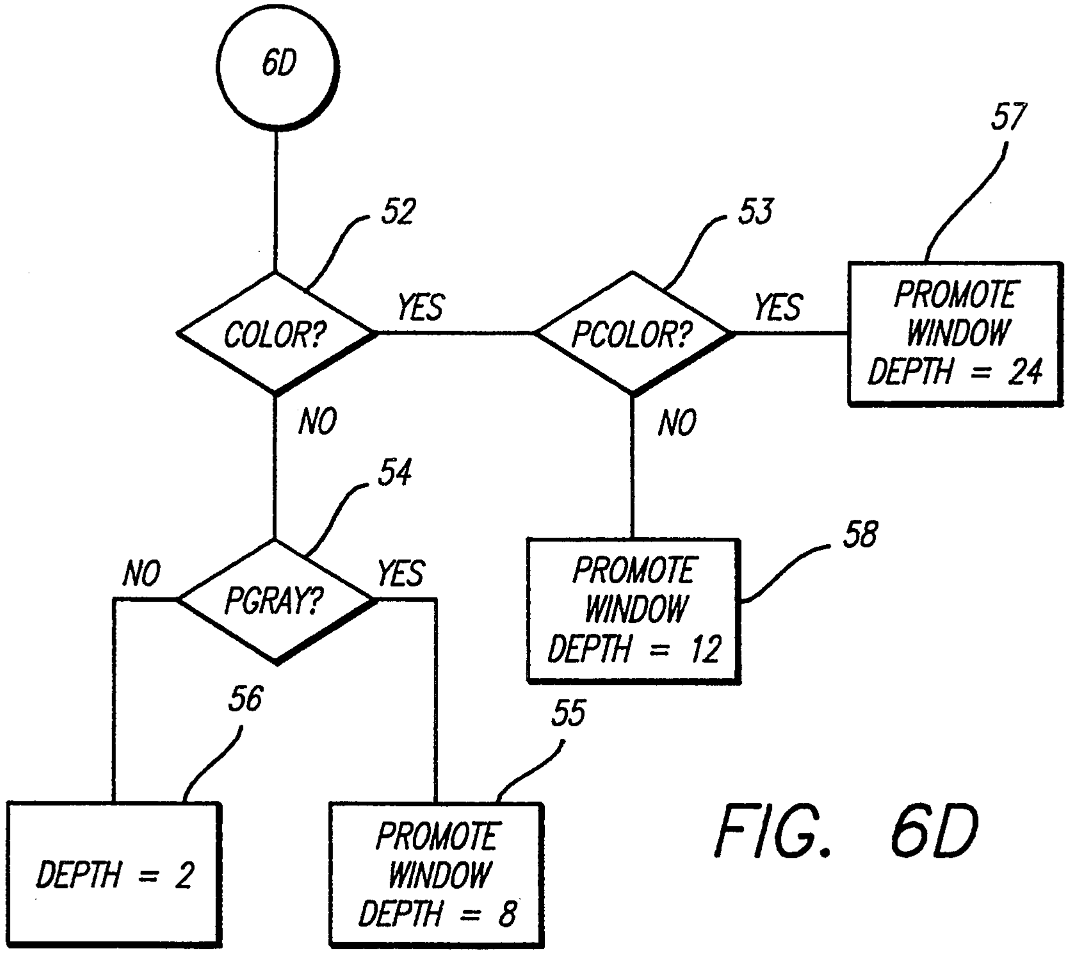

If the cap is not equal to 12 bits per pixel at decision block 38, the system proceeds to step 6D. Referring now to FIG. 6D, at decision block 52 it is determined if color is requested. If color is requested, the system proceeds to decision block 53 and it is determined if precision color is requested. If precision color is requested, the window is promoted to a depth of 24 bits per pixel at step 57. If precision color is not requested, the window is promoted to a depth of 12 bits per pixel at step 58.

If color is not requested at decision block 52, the system proceeds to step 54 and it is determined if precision gray is requested. If precision gray is requested, the window is promoted to 8 bits per pixel at step 55. If precision gray is not requested, the depth of the window remains 2 bits per pixel at step 56.

Refer now to FIG. 6B, which illustrates the operation when the current depth of the window is 8 bits per pixel. When the depth of the window is 8 bits per pixel, there can be no promotion unless the cap is 24 bits per pixel. At decision block 44, it is determined if color is requested. If color is requested, the window is promoted to 24 bits per pixel at step 45. If color is not requested, the depth of the window remains at 8 bits per pixel at step 46.

FIG. 6C illustrates the case where the current depth is 12 bits per pixel and the cap is 24 bits per pixel. At decision block 47, it is determined if color is requested by the program. If color is requested, the system proceeds to decision block 48 and it is determined if precision color is requested. If precision color is requested, the window is promoted to a depth of 24 bits per pixel at step 50. If precision color is not requested, the depth of the window remains at 12 bits per pixel at step 51. If color is not requested at decision block 47, the window depth remains at 12 bits per pixel at step 49.

In this invention, a window cannot contain more information than that of its depth limited representation. Window promotion occurs only if there is no information lost. The number of samples per pixel and the number of bits per sample cannot decrease during window promotion. Each must always be less than that of the depth limited representation.

An example of PostScript code drawing commands that may be received by the controller is as follows:

```
1 0 0 setrgbcolor
newpath 0 0 moveto 100 100 lineto
0 100 lineto closepath
stroke
```

The drawing command interpreter converts this command into a list of pixels to obtain and the color to set these pixels to. This is a mask operation. Next, the controller uses the window type and geometry type of the destination window to decide where to draw the pixels. A promotion check for the window is made and the window is promoted, if necessary. Then the mark procedure for that storage location is called. An example of the mark procedure related to window promotion is as follows:

LMark

Fill the intersection of the given graphic and clipper in the current layer. The clip may be NULL, in which case the whole graphic is drawn within the limits of the window.

```
LMark(PDevice pdevice, DevPrim *graphic, DevPrim *clip,
DevMarkInfo *infor) {
  /* Check layer promotion */
  if (!layer->capped) {
      boolean isColor, preciseColor, preciseGray;
      isColor = preciseColor = preciseGray = false;
      if (graphic->type == imageType) {
          DevImageSource *source = graphic->value.image-
          >source;
          if (source->nComponents > 1) {
              isColor = true;
              preciseColor = (source->bitspersample > 4);
          }
          preciseGray = (source->bitspersample > 2);
      } else {
```

```
        DevColorVal c = * ((DevColorVal *) &info->color);
        unsigned char a = ALPHAVALUE (PSGetGStateExt
        (NULL));
        unsigned int uc;
        uc = (*(unsigned int *) &c) &0xFFFFFF00 | a;
        preciseGray = ((c.white!=NX_BLACK &&
                c.white!=NX_DKGRAY &&
                c.white!+NX_LTGRAY &&
                c.white!=NX_WHITE) ||
                (a!=0 && a!=0x55 && a!=0xAA && a!=0xFF));
        if (isColor = ! (c.red==c.green && c.green==c.blue))
                preciseColor = ((uc&0xF0F0F0F0) ! = ((uc<<4)
                &0xF0F0F0F0));
}
if (preciseGray || isColor)
                LPromoteLayer (layer, isColor, preciseColor,
                preciseGray, 0);
/* If layer doesn't have alpha and the mark does, then the layer will
*/
if (layer->alphaState != [illegible]_BITS) {
    if (graphic->type == imageType) {
            DevImage *image = graphic->value.image;
            if ((image->imagemask && ALPHAVALUE
            (PSGetGStateExt (NULL)) !=OPAQUE)
            || image->unused)
                    LSetAlphaBits (layer);

    }
```

```
else if (ALPHAVALUE (PSGetGStateExt (NULL)) != OPAQUE)

        LSetAlphaBits (layer);

}

/* Mark graphics elements into layer here*/

}
```

The system of the present invention allows each window to have a different depth. Therefore, windows that do not require the full depth limit of the frame buffer can be stored using less memory than prior art systems. This results in a more efficient use of memory since backing store buffers are only as deep as needed to fully represent their contents. Thus, a method and apparatus for providing a multiple bit depth windows has been described.

We claim:

1. A method for dynamically determining in a computer a depth of a display window when interpreting drawing commands to said display window received from a plurality of application programs, said method comprising the steps of:

identifying a current depth of said window, where said current depth is a current bit per pixel depth;

identifying in said computer a current desired bit per pixel depth of said window based on information contained in said drawing commands provided by an application program;

identifying in said computer a maximum desired depth of said window where said maximum desired depth is the maximum desired bit per pixel depth;

comparing in said computer said current depth with said current desired depth and with said maximum desired depth;

setting said current depth of said window equal to said current desired depth when said current desired depth is less than or equal to said maximum desired depth: and setting said current depth equal to said maximum desired step when said current desired depth is greater than said maximum desired depth.

2. The method of claim 1 wherein said current desired depth is determined by examining information contained in said drawing commands.

3. The method of claim 2 wherein said step of setting said current depth is executed such that said current depth is equal to one of first, second, third, and fourth depths.

4. The method of claim 3 wherein said first depth is 2 bits per pixel, said second depth is 8 bits per pixel, said third depth is 12 bits per pixel, and said fourth depth is 24 bits per pixel.

5. The method of claim 4 wherein said maximum desired depth is one of said third and fourth depths when said window is a color window.

6. The method of claim 5 wherein said maximum desired depth is said fourth depth when said display window is a precision color window.

7. The method of claim 6 wherein said maximum desired depth is one of said first and second depths when said display window is a gray scale window.

8. The method of claim 7 wherein said maximum desired depth is said second depth if said display window is a precision gray scale window.

9. The method of claim 1 wherein said maximum desired depth of a window is selectably altered with each drawing command.

10. The method of claim 9 wherein said current depth is initially equal to a depth of a frame buffer on which said window is to be displayed.

11. A method of determining in a computer a bit per pixel depth of a display window comprising the steps of:

identifying a current depth of said window as one of a first, second, third, and fourth depths;

identifying in said computer a frame buffer depth of a frame buffer of said window, said frame buffer being one of said first, second, third, and fourth depths;

identifying in said computer a maximum desired depth of said window;

comparing in said computer said maximum desired depth with said frame buffer depth; and, defining a bit per pixel depth of said window as said maximum desired depth when said maximum desired depth is less than or equal to said frame buffer depth;

defining a depth of said window as said frame buffer depth when said maximum depth is greater than said frame buffer depth.

12. The method of claim 11 wherein said said first depth is 2 bits per pixel, said second depth is 8 bits per pixel, said third depth is 12 bits per pixel, and said fourth depth is 24 bits per pixel.

13. The method of claim 12 wherein said maximum desired depth is said first depth when said window is a low precision gray scale window.

14. The method of claim 13 wherein said maximum desired depth is said second depth when said window is a high precision gray scale.

15. The method of claim 14 wherein said maximum desired depth is said third depth when said window is a low precision color window.

16. The method of claim 15 wherein said maximum desired depth is said fourth depth when said window is a high precision color window,

* * * * *